(12) United States Patent
Backes

(10) Patent No.: US 9,950,659 B2
(45) Date of Patent: Apr. 24, 2018

(54) METHOD FOR CONTROLLING AN INTERIOR LIGHTING SYSTEM IN A VEHICLE AND INTERIOR LIGHTING SYSTEM

(71) Applicant: TRW Automotive Electronics & Components GmbH, Radolfzell (DE)

(72) Inventor: Ulrich Backes, Radolfzell (DE)

(73) Assignee: TRW Automotive Electronics & Components GmbH (DE)

( * ) Notice: Subject to any disclaimer, the term of this patent is extended or adjusted under 35 U.S.C. 154(b) by 277 days.

(21) Appl. No.: 14/402,403

(22) PCT Filed: Jul. 5, 2013

(86) PCT No.: PCT/EP2013/064219
§ 371 (c)(1),
(2) Date: Nov. 20, 2014

(87) PCT Pub. No.: WO2014/009262
PCT Pub. Date: Jan. 16, 2014

(65) Prior Publication Data
US 2015/0145410 A1    May 28, 2015

(30) Foreign Application Priority Data
Jul. 11, 2012    (DE) .................. 10 2012 013 783

(51) Int. Cl.
*B60Q 1/14* (2006.01)
*B60Q 3/00* (2017.01)
*H05B 37/02* (2006.01)
*B60Q 3/80* (2017.01)
*B60Q 3/16* (2017.01)

(52) U.S. Cl.
CPC ............... *B60Q 3/00* (2013.01); *B60Q 3/16* (2017.02); *B60Q 3/80* (2017.02); *H05B 37/02* (2013.01)

(58) Field of Classification Search
CPC ........ B60Q 1/44; B60Q 1/143; B60Q 1/1423; B60Q 9/001; B60Q 2300/112;
(Continued)

(56) References Cited

U.S. PATENT DOCUMENTS 6,141,432 A * 10/2000 Breed ..................... B60J 10/00
                                                          348/143
6,160,475 A * 12/2000 Hornung .............. B60Q 3/0216
                                                          307/10.8

(Continued)

FOREIGN PATENT DOCUMENTS

DE    197 45 275     4/1999
DE    198 22 636    11/1999
(Continued)

*Primary Examiner* — Minh D A
(74) *Attorney, Agent, or Firm* — Tarolli, Sundheim, Covell & Tummino LLP

(57) ABSTRACT

In a method of controlling an interior lighting (25) in a vehicle (18), having a plurality of separately drivable lamps (26a-26g), provision is made that a motion light pattern, in particular a wave light pattern, is generated as a function of vehicle operating data by separately driving the individual lamps (26a-26g), all of the lamps (26a-28g) being driven with an identical or similar light pattern, and the lamps (26a-26g) being driven with the light pattern offset in time. The time offset with which the lamps (26a-26g) are driven is dependent on the driving speed of the vehicle.

15 Claims, 3 Drawing Sheets

(58) Field of Classification Search
CPC .... B60Q 3/0293; B60Q 11/005; B60Q 1/387;
B60Q 1/2603; B60Q 3/048; B60Q 1/122;
B60Q 2300/122; B60Q 1/124; B60Q
1/1415; B60Q 1/18; F21V 23/02; F21V
25/12; H05B 37/0236; A63J 17/00; F21L
14/026; B60R 16/03; H02K 21/48; B62J
6/001; B62J 6/003; H02J 7/1492
USPC ....................................................... 315/77–82
See application file for complete search history.

(56) References Cited

U.S. PATENT DOCUMENTS

| | | | |
|---|---|---|---|
| 9,758,093 B2 * | 9/2017 | Backes | B60Q 3/00 |
| 2003/0076045 A1 * | 4/2003 | Toda | B60Q 1/115 |
| | | | 315/82 |
| 2006/0239017 A1 * | 10/2006 | Woo | B60Q 3/046 |
| | | | 362/459 |
| 2008/0101079 A1 * | 5/2008 | Kitamura | B62J 6/001 |
| | | | 362/473 |
| 2008/0186701 A1 | 8/2008 | Omi | |
| 2008/0309477 A1 | 12/2008 | Dakov | |
| 2010/0207530 A1 | 8/2010 | Maruyama et al. | |
| 2012/0139415 A1 * | 6/2012 | Lee | B60Q 3/0293 |
| | | | 315/79 |

FOREIGN PATENT DOCUMENTS

| | | |
|---|---|---|
| DE | 10 2010 020 566 | 11/2011 |
| WO | 02090824 | 11/2002 |

* cited by examiner

METHOD FOR CONTROLLING AN INTERIOR LIGHTING SYSTEM IN A VEHICLE AND INTERIOR LIGHTING SYSTEM

RELATED APPLICATIONS

This application corresponds to PCT/EP2013/064219, filed Jul. 5, 2013, which claims the benefit of German Application No. 10 2012 013 783.4, filed Jul. 11, 2012, the subject matter, of which are incorporated herein by reference in their entirety.

BACKGROUND OF THE INVENTION

The present invention relates to a method of controlling an interior lighting according to the generic part of claim 1. The invention further relates to an interior lighting for a vehicle.

DE 10 2010 018 336 and DE 10 2011 014 262 A1 disclose vehicle interior lightings including a plurality of lamps which can generate a defined light pattern in the vehicle by the lamps being driven separately from each other.

Modern vehicles feature an ever better noise reduction and also better chassis, so that driving noises, for instance wind, rolling or engine noises, are effectively reduced in the vehicle interior. While this increases the driving comfort of the vehicle, it makes it more difficult for the driver of the vehicle to estimate the speed or the acceleration of the vehicle correctly.

While the driver does receive a feedback about the driving condition, for instance about the speed of the vehicle, via the monitoring instruments of the vehicle, for instance via the speed indicator, the driver may be distracted from these monitoring instruments by other indicators and operating elements in the vehicle or by the traffic situation, so that the driver can not perceive a change in speed in time. In addition, especially during long drives in the vehicle, the driver's attention may decrease so that it is difficult for the driver to perceive all the information provided by the monitoring instruments.

SUMMARY OF THE INVENTION

It is the object of the invention to provide a system and a method for allowing the driver to better assess the driving condition of the vehicle.

To achieve the object, provision is made for a method of controlling an interior lighting in a vehicle including a plurality of separately drivable lamps, with a motion light pattern, in particular a wave pattern, being generated as a function of vehicle operating data by separately driving the individual lamps. The basic idea of the invention is to make use of an interior lighting that illuminates the interior of the vehicle indirectly or directly, to inform the driver about various operating conditions of the vehicle, for instance the driving speed. The motion light pattern is generated by driving the lamps separately; here, a luminous period, an off period or luminous pause, and the luminous intensity can be set separately for each lamp.

By selectively driving the individual lamps, a motion light pattern can for example be generated in the vehicle which imitates the changes of light when driving through a tree-lined road or a road through a wooded area with the sun standing low. The incident light creates dark, shadowy areas and areas with a direct incidence of light on such a road. The driver passes through these areas with the vehicle and receives an effective feedback about the actual speed of the vehicle on the basis of the periodic changes between brightness and shadow. When the vehicle moves faster, these changes between bright and dark areas are correspondingly faster or, respectively, slower at a lower speed. On such a road, the driver can therefore perceive a change in speed due to the quicker or slower change of light or assess his/her speed based on these changes of light even without a look at the speed indicator.

The invention is based on the consideration of imitating the motion light pattern of such a natural light/dark change in the vehicle, in order to provide a visual feedback to the driver about the driving condition of the vehicle even in the absence of such external indications, because of which an assessment of the driving speed is not possible. The difference in brightness here need not correspond to the actual differences in brightness on such a road. The change in brightness merely needs to be sufficiently great for the driver to be able to perceive it consciously or subconsciously. On the other hand, it would also be possible to damp strong changes of light, especially in wooded areas, so that the driver is not so heavily distracted by the strong changes of light.

In addition, the driver's brain can be stimulated by a corresponding motion light pattern, so that the method according to the invention can prevent or at least delay a tiredness of the driver.

The motion light pattern is intended to simulate the natural motion light pattern in the vehicle, for example, when driving on a road in a wooded area or passing through a tree-lined road. This is effected in that a substantially periodically recurrent light pattern is generated. The change between shadow and bright areas of such a tree-lined road is simulated by the periodically recurring change between switching the lamps on and switching the lamps off.

To generate such a motion light pattern in the vehicle, according to the invention all of the lamps are driven with an identical or at least similar light pattern, the lamps being driven with the light pattern offset in time. A feedback about the driving speed or an acceleration in the longitudinal direction of the vehicle is given by driving the lamps offset in time in the longitudinal direction of the vehicle, in particular in the direction of travel, so that a motion light pattern is generated that runs in the longitudinal direction of the vehicle.

In order to avoid that the vehicle occupant becomes accustomed to this light pattern or in order to simulate a more natural, more irregular course, the period of this light pattern may more particularly have a defined variance, so that the luminous period and/or the off period of the individual lamps is varied within a certain defined range.

To allow the driver to assess the vehicle speed, the time offset of the lamps is preferably selected such that the motion light pattern moves at the speed of the vehicle contrary to the direction of travel whereby a motion light pattern is generated that imitates the natural light/shadow change when driving through a wooded area.

To provide a feedback to the driver about a lateral acceleration of the vehicle, for instance in cornering, it is also conceivable for the lamps to be driven offset in time in the transverse direction of the vehicle, so that a motion light pattern is generated that runs in the vehicle transverse direction of the vehicle.

The time offset with which the lamps are driven may be dependent on the driving speed of the vehicle, for example. This time offset can be controlled such that the speed of the motion light pattern in the longitudinal direction of the vehicle or in the transverse direction of the vehicle corresponds to the actual speed of the vehicle in this direction. But if is also conceivable that the time offset is controlled such that the motion light pattern is faster or slower then the actual speed of the vehicle, and in this way too high or too low a speed, for example, is simulated to the driver. By the simulation of too high a speed, for example, the driver can be admonished to reduce the speed.

The time offset with which the lamps are driven may, however, also be dependent on the acceleration of the vehicle in the longitudinal and/or transverse direction, so that the driver receives a feedback about the acceleration of the vehicle. This is of advantage in lateral accelerations, in particular in cornering.

The vehicle operating data used for controlling the motion light pattern may include acceleration data or speed data of the vehicle, for example.

But if is also conceivable that the vehicle operating data includes ambient data picked up by means of a sensor, in particular a light sensor. Thereby, the ambient brightness can be measured, for example, and the brightness and/or the light pattern of the individual light sources can be controlled accordingly. The motion light pattern can thus be adjusted in such a way that although the driver receives a feedback about the driving condition of the vehicle, the vehicle occupant will not be overly distracted, for instance by the lamps shining too brightly. The intensity of the motion light pattern can also be adjusted manually by the driver.

The vehicle operating data may be stored in a memory, so that the respective data can be read out from this memory for different operating conditions of the vehicle. If is conceivable, for instance, that this vehicle operating data is matched against a positioning system such as a GPS, so that for specific distances a defined motion light pattern is stored or predefined which can be retrieved when the vehicle moves through this particular stretch of the road. The vehicle operating data may, for example, also be determined via the positioning system.

In addition to the motion light pattern, the light pattern of the individual lamps may also be dependent on the driving speed of the vehicle. At a higher speed, the natural alternations between brightness and darkness occur at correspondingly shorter intervals so that the lamps are driven such that the luminous periods and luminous pauses will be correspondingly shorter.

Accordingly, the light pattern of the individual lamps may also be dependent on the acceleration of the vehicle in the longitudinal direction or in the transverse direction.

To achieve the object, furthermore provision is made for an interior lighting for a vehicle, comprising a lighting device including at least two lamps which can be driven separately, and comprising a controller which can drive the lamps separately. The lamps are driven by a method according to the invention, and at least one sensor is provided for acquiring vehicle operating data.

The inferior lighting preferably includes a memory for vehicle-specific data, so as to allow a motion light pattern for a particular driving condition to be retrieved or stored intermediately, by means of which the lamps or the interior lighting can be driven.

Preferably, the lamps are arranged in the longitudinal direction of the vehicle or in the transverse direction of the vehicle, so that based on the lamps being driven offset in time, a feedback about the driving speed or the acceleration of the vehicle is possible.

BRIEF DESCRIPTION OF THE DRAWINGS

Further advantages and features of the invention will be apparent from the description below in conjunction with the accompanying drawings, in which.

DESCRIPTION OF EMBODIMENTS

Figure 1:
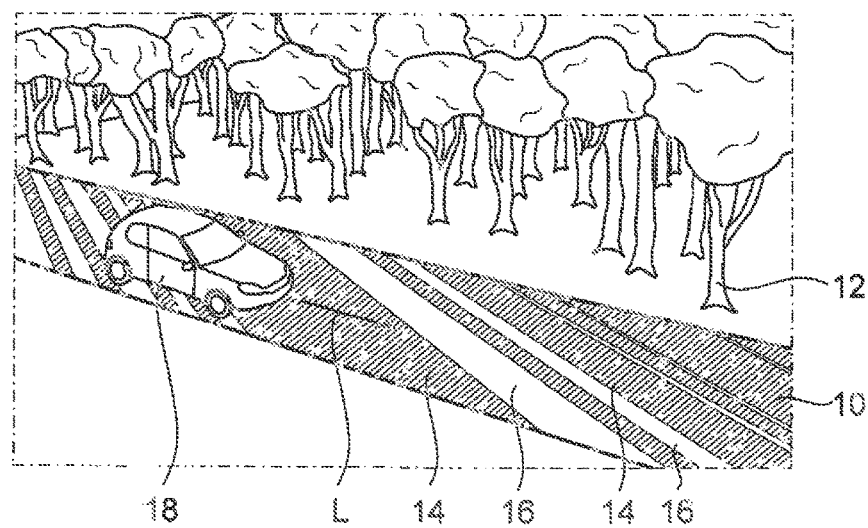
FIG. 1 shows an illustration of a natural light pattern of a vehicle when it travels on a road through a wooded area.

FIG. 1 schematically shows a road 10 which leads through a wooded area 12. The incidence of light creates on the road 10 areas 14 of low brightness or shadow and areas 18 with a direct incidence of light, i.e. of high brightness. A vehicle 18 that travels on the road 10 in a direction L of motion, passes through these dark and bright areas 14, 16.

Figure 2:
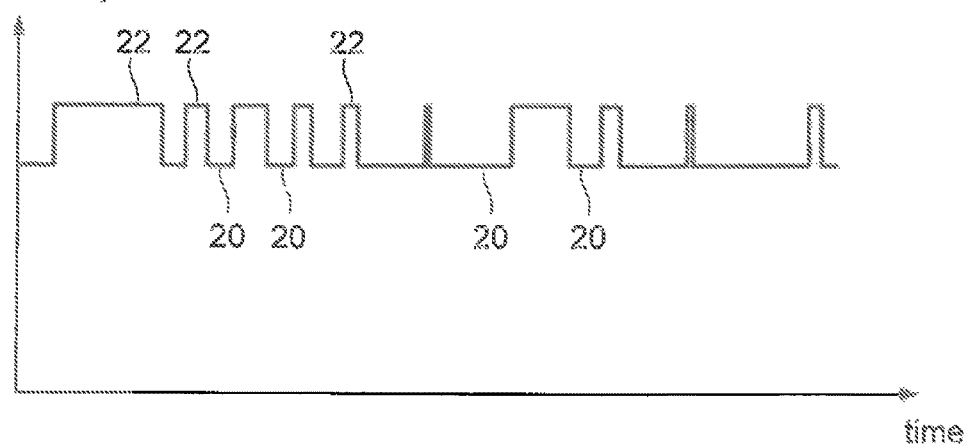
FIG. 2 shows an illustration of a light pattern at one point of the vehicle in motion when it travels along the road of FIG. 1.

The light pattern 24 illustrated in FIG. 2 is produced at a measuring point positioned at any desired point in the vehicle 18 when travelling on the road 10. When the measuring point passes through the areas 14 of low brightness, the light intensity at the measuring point is lower for this period of time (sections 20). When the measuring point passes through bright areas, the light intensify at the measuring point is correspondingly higher for this period of time (sections 22). The time duration of the sections 20, 22 is dependent on the width of the bright and, respectively, dark areas 14, 16 of the road and on the speed of the vehicle 18. Basically, as the speed increases, the sections 20, 22 become shorter.

Figure 3:
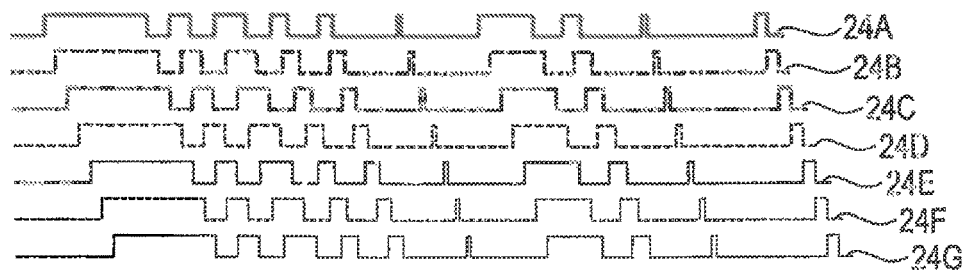
FIG. 3 shows a motion light pattern in a vehicle in motion when if travels along the road of FIG. 1.

FIG. 3 shows a motion light pattern which is composed of the light patterns 24A-24G of different measuring points which are arranged evenly distributed in the vehicle 18 in the longitudinal direction of the vehicle 18. As can be seen in FIG. 3, the course of the light patterns 24A-24G is approximately the same since the measuring points pass through the same dark and bright areas 14, 16. A small variation may occur in the case of a tree-lined road, for example, by the motions of the trees, which may result in a slightly altered bright/dark pattern.

But since the measuring points are arranged offset in the direction of travel, they enter a bright or a dark area offset in time, so that the light patterns at the individual points A through G are offset in time with respect to each other. This time offset is thus dependent on the speed of the vehicle 18.

Since both the light pattern at a particular measuring point, that is, the time duration of the dark sections 20 and the bright sections 22, and also the light pattern composed of a plurality of light patterns 24A-24G are dependent on the speed of the vehicle 18, such a light distribution pattern makes it easier for a driver to assess the speed of the vehicle 18.

The invention is based on the idea of imitating these changes of light in the vehicle 18 in order to allow the driver to intuitively assess the driving condition such as, e.g., the traveling speed, even in the absence of such a natural change of light. This is of advantage in particular with modern vehicles since a driver of such a vehicle receives less feedback about the actual driving speed owing to an improved noise damping and a more modern chassis, in addition, because of the large number of displays and operating elements in the vehicle, the driver may be distracted from the speed indicator of the vehicle, so that the driver may not perceive a change in speed in time.

Figure 4:
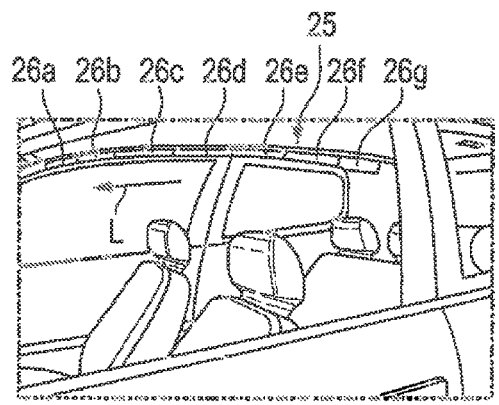
FIG. 4 shows an interior lighting according to the invention.

In order to still provide the driver with a feedback about the traveling speed, provision is made for the interior lighting 25, shown in FIG. 4, of a vehicle 18.

Figure 5:
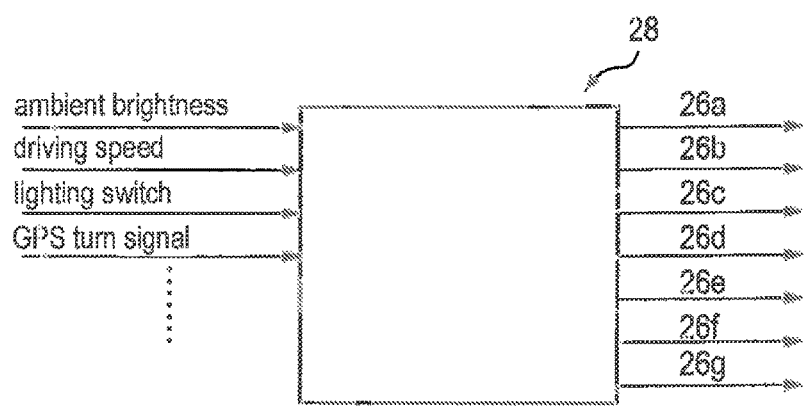
FIG. 5 shows a schematic representation of the controller of the inferior lighting of FIG. 3.
Figure 6:
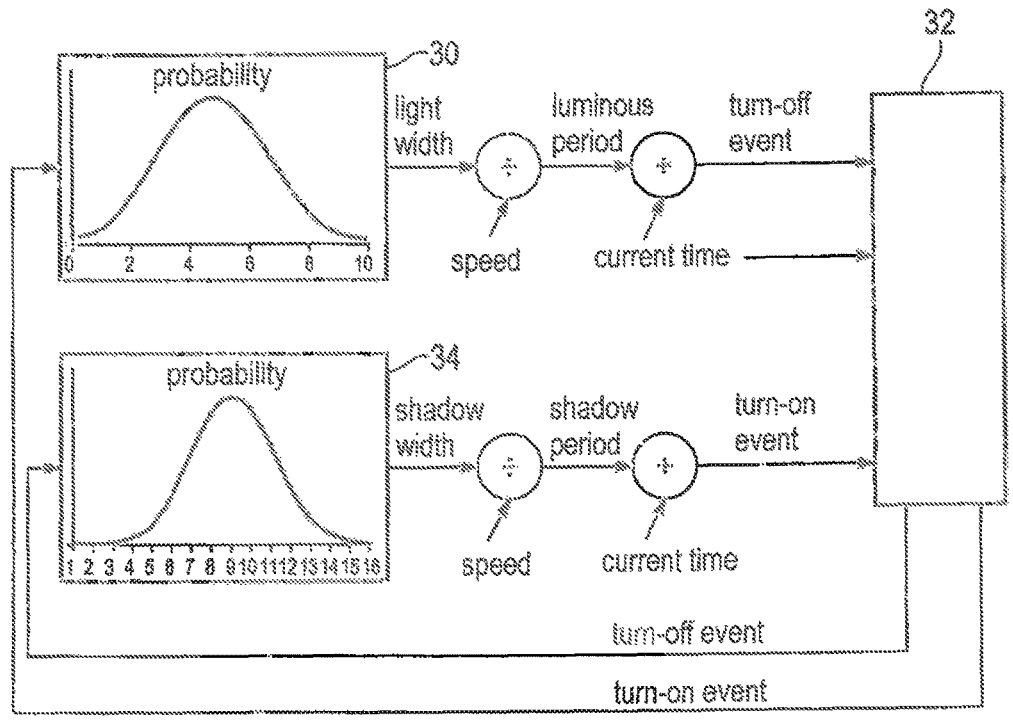
FIG. 6 shows a detailed illustration of the method according to the invention for driving a lamp of the interior lighting of FIG. 3.

The inferior lighting 25 includes a plurality of lamps 26a through 26g which, in the embodiment shown here, are arranged one behind the other in the longitudinal direction L of the vehicle. The interior lighting 25 further includes at least one sensor (not shown here) for acquiring vehicle operating data or ambient data, and a controller 28 schematically illustrated in FIG. 5.

The controller 28 can drive the lamps 26a through 26g separately from each other, the controller 28 being adapted to control the luminous periods, luminous pauses, and the luminous intensity of the individual lamps 26a through 26g.

Furthermore, the controller 28 can take up and/or process vehicle operating data, for instance the driving speed, an acceleration or the position of the vehicle, or also ambient data such as for example the ambient brightness or respective changes in brightness.

The controller 28 drives the individual lamps 26a through 26g separately from each other as a function of the vehicle operating data measured, such as, for example, the driving speed or the acceleration of the vehicle or the ambient brightness.

By suitably selecting the luminous period and/or the off period of the individual lamps 26a through 26g and an offset in time when driving the individual lamps 26a through 26g, a motion light pattern can be imitated in the vehicle by the controller 28 which corresponds to the natural motion light pattern illustrated in FIG. 3 that occurs when traveling on a road 10 through a wooded area. In this way, a feedback about the actual traveling speed can be conveyed to the driver of the vehicle 18, even in the absence of external indications, for instance in the darkness.

In addition, the motion light pattern or also a variation in the motion light pattern can bring about a stimulation of the driver's brain that can counteract a tiredness of the driver.

The light pattern of the individual lamps 26a through 26g may be a periodically recurrent light pattern. The luminous periods and the off periods of the individual lamps 26a through 26g may, however, vary within a defined range, for instance by a random control, so as to counteract any habituation effect and/or to make the motion light pattern appear more natural.

A method of driving the lamps 26a through 26g is illustrated by way of example in FIG. 8 by means of a lamp 26a. In a first step, a probable light width of a bright area 16 is generated by means of a random number generator 30. By dividing this light width by the current speed of the vehicle 18, the luminous period of the temp 26a is calculated. The luminous period is added to the current time and thus the point in time is determined at which the lamp 26a is switched off, i.e. the simulated entry into a dark area 14 occurs. This value is stored in a time-controlled memory 32.

This memory 32 performs a continuous comparison of the time values of the stored events with the current time and, when the comparison is appropriate, if causes the lamp to be switched on or switched off.

Subsequently, a second random number generator 34 generates a value for a probable shadow width of the area 14. This shadow width is divided by the speed of the vehicle 18, and thus the time duration of switching the lamp 26a off is established. An addition to the current time results in the point in time at which the vehicle exits the simulated shadow and the lamp 28 is switched on again.

Then this process is repeated.

Figure 7:
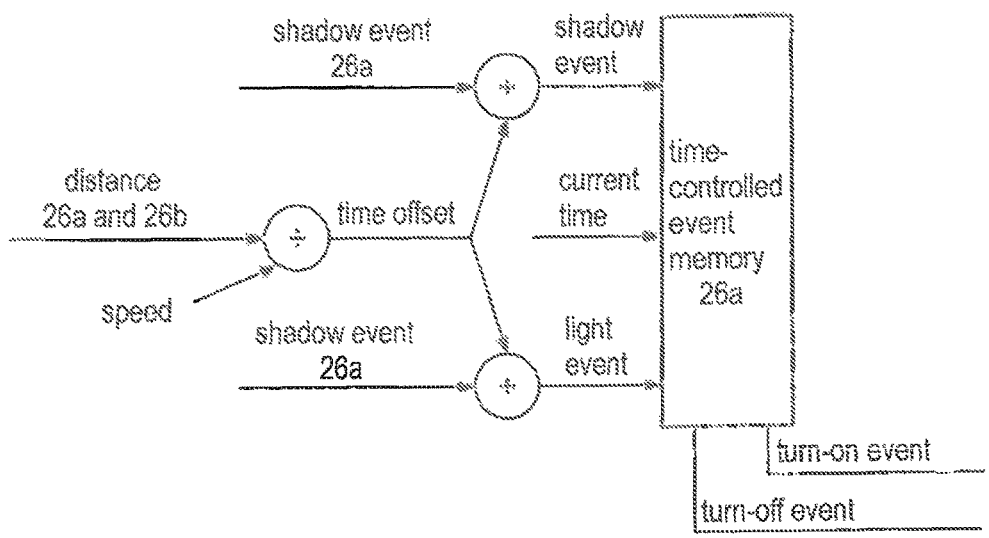
FIG. 7 shows the drive method for a further light source of the interior lighting of FIG. 3.

The driving of two neighboring lamps 26a, 26b is illustrated schematically in FIG. 7. The distance between the lamps 26a, 26b is divided by the speed of the vehicle, which results in the time offset between the light patterns of the individual lamps 26a, 26g. The turn-on times and turn-off times, offset in time, for the individual lamps 26a, 26g are thereby calculated, and they are stored in the memory 32.

The turn-on times and turn-off times are compared to the actual time. If the actual time corresponds to the turn-on time or turn-off time established, the corresponding event is triggered for the respective lamp 26a, 26b.

In the exemplary embodiment shown here, the time offset with which the lamps 26a through 26g are driven is dependent on the driving speed or the acceleration. If it is intended to convey to the driver a feeling for the actual traveling speed of the vehicle, the time offset is selected such that it corresponds to the actual traveling speed, i.e. the motion light pattern corresponds to that of a wooded area through which the vehicle travels at the same speed.

The luminous intensity of the individual lamps is selected here such that the motion light pattern can be perceived by the vehicle occupant while if does not distract or, for instance, dazzle the driver.

But it is also conceivable that the motion light pattern has a shorter time offset or a longer time offset, so that the driver is given the impression of a higher driving speed or a lower driving speed, for example in order to advise the driver of too high a speed or to cause the driver to go slower.

The driver can also adjust the time offset himself/herself for example, such as, e.g., by means of an additional operating unit, so that the driver can set the speed or the time offset such that it is comfortable for him/her.

In the embodiment shown here, the lamps 26a through 26g are arranged in the longitudinal direction L of the vehicle. This allows the driving speed of the vehicle to be simulated. When the lamps 26a through 26g are driven in a suitable manner, it is also possible to visualize an acceleration of the vehicle to give the driver an impression about the acceleration of the vehicle.

Furthermore, if is also possible for the lamps 26a through 26g to be arranged in the transverse direction in the vehicle, so that the driver can be provided with a feedback by means of the lamps 26a through 26g about a transverse speed or a lateral acceleration, for example when cornering. The lateral acceleration may be determined by means of additional sensors or, for instance, by making use of stored road data that is compared with a GPS.

In the embodiment shown here, the lamps 26a through 26g are arranged at the inside roof lining of the vehicle 18. But it is also conceivable that they are arranged at a different location in the vehicle, for instance at the vehicle floor.

The lamps 26a through 26g may illuminate the interior directly, for example; but it is conceivable that they illuminate the inferior indirectly by reflection, so as to prevent the vehicle occupants from being dazzled.

The lamps 26a through 26g are LEDs, for example, which allow a large-area illumination of the interior. Preferably, they are dimmable so as to allow an adaptation of the brightness of the light patterns 26a through 26g to the brightness outside or inside the vehicle, for example. But the driver can also adjust the brightness of the light pattern himself/herself, for example by means of an operating unit. If the lamps 26a through 26g are dimmable, this additionally allows a slow transition between luminous phases and dark phases, which is more pleasing to the driver. This may be effected by a sinusoidal course between brightness and darkness, for example.

The controller 28 may include a memory, for instance, in which respective motion light patterns are saved for different operating conditions of the vehicle, it is also conceivable that the controller 28 precalculates the motion light pattern or the light patterns for the individual lamps 26a through 26g and, in doing so, resorts to route data of a GPS, for instance.

The interior lighting may also be switched on for a longer period of time to use it in the vehicle for some other purpose, for example for reading. It is also conceivable that the controller determines the number of the vehicle occupants, and the lamps 26a through 26g are driven only in those areas where vehicle occupants are present.

The invention claimed is:

1. A method of controlling an interior lighting (25) in a vehicle (18), comprising a plurality of separately drivable lamps (26a-26g), wherein a motion light pattern, in particular a wave pattern, is generated as a function of vehicle operating data by separately driving the individual lamps (26a-26g), all of the lamps (26a-26g) being driven with an identical or similar light pattern, and the lamps (26a-26g) being driven with the light pattern offset in time, wherein the time offset with which the lamps (26a-26g) are driven is dependent on the driving speed of the vehicle to inform a driver of the vehicle (18) about the driving speed of the vehicle.

2. The method according to claim 1, wherein a substantially periodically recurrent light pattern is generated, the period of the light pattern more particularly having a defined variance.

3. The method according to claim 1, wherein the lamps (26a-26g) are driven offset in time in the longitudinal direction (L) of the vehicle, in particular in the direction of travel, so that a motion light pattern is generated that runs in the longitudinal direction of the vehicle.

4. The method according to claim 1, wherein the lamps (26a-26g) are driven offset in time in the transverse direction of the vehicle, so that a motion light pattern is generated that runs in the vehicle transverse direction of the vehicle.

5. The method according to claim 1, wherein the time offset with which the lamps (26a-26g) are driven is dependent on the acceleration of the vehicle in the longitudinal direction and/or in the transverse direction.

6. The method according to claim 1, wherein the vehicle operating data includes acceleration data or speed data of the vehicle.

7. The method according to claim 1, wherein the vehicle operating data includes ambient data picked up by means of a sensor, in particular a light sensor.

8. The method according to claim 1, wherein the vehicle operating data is stored in a memory.

9. The method according to claim 1, wherein the light pattern is dependent on the driving speed of the vehicle.

10. The method according to claim 1, wherein the light pattern is dependent on the acceleration of the vehicle in the longitudinal direction and/or in the transverse direction.

11. An interior lighting (25) for a vehicle (18), comprising at least two lamps (26a-26g) which can be driven separately, and a controller (28) which can drive the lamps (26a-26g) separately, wherein the lamps (26a-26g) are driven by a method according to claim 1, and that at least one sensor is provided for acquiring vehicle operating data.

12. The interior lighting according to claim 11, wherein a memory (32) for the vehicle-specific data is provided.

13. The interior lighting according to claim 11, wherein the lamps (26a-26g) are arranged in the longitudinal direction (L) of the vehicle and/or in the transverse direction of the vehicle.

14. The method according to claim 1, wherein the light pattern of one individual lamp is offset from the light pattern of another individual lamp to generate the wave pattern and inform the driver of the vehicle about the driving speed of the vehicle.

15. A method of controlling an interior lighting in a vehicle, comprising:

separately driving a plurality of individual lamps with an identical or similar light pattern as a function of vehicle operating data to generate a wave light pattern, the light pattern of each individual lamp being offset in time from the light pattern of each other individual lamp by an amount dependent on the driving speed of the vehicle such that the wave pattern informs a driver of the vehicle about the driving speed of the vehicle.

* * * * *